G. Homfray.
Making Chain.
Nº 62,335. Patented Feb. 26, 1867.
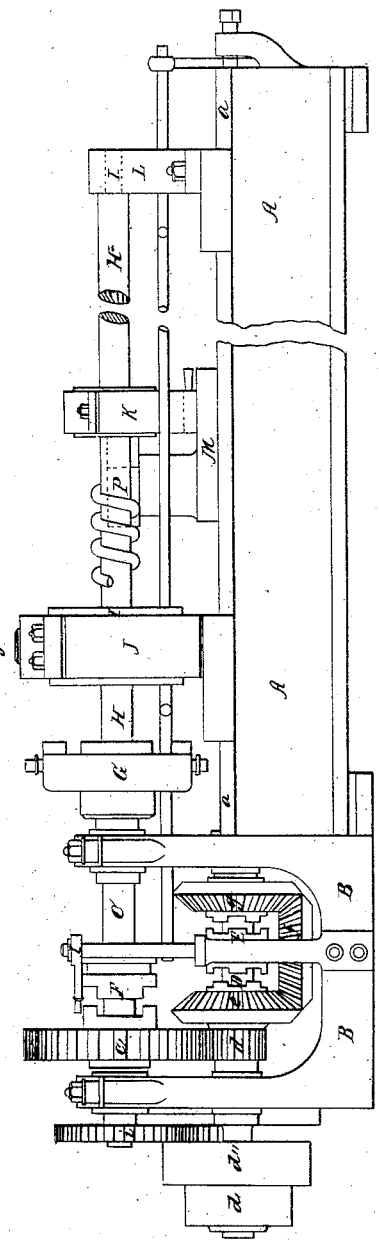
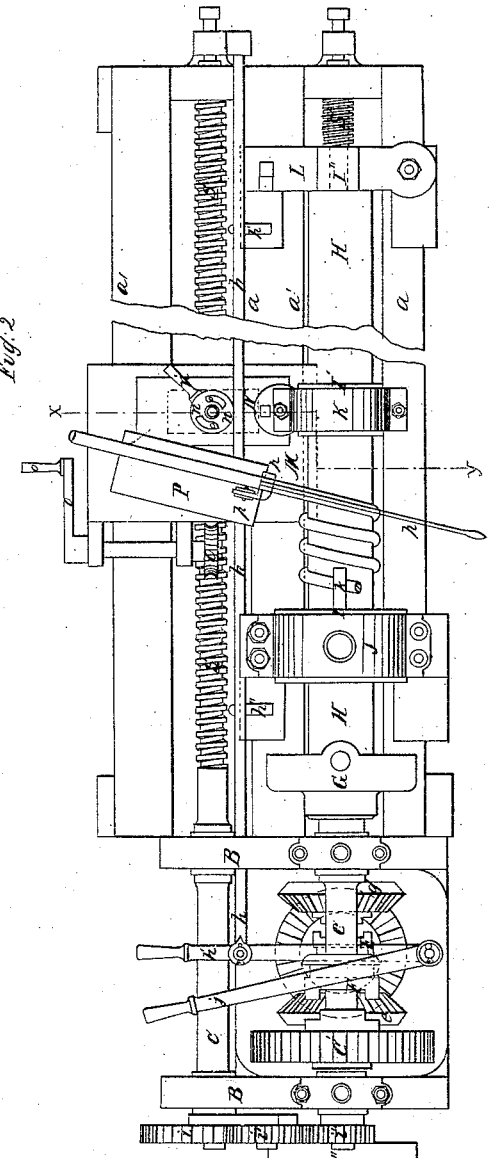
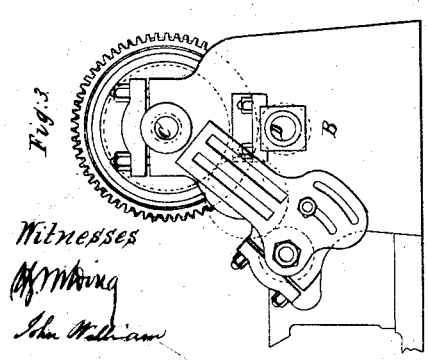
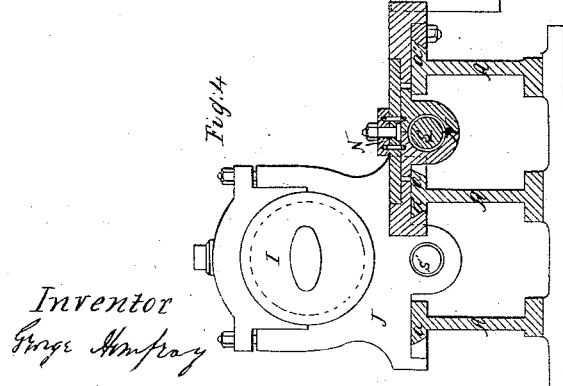
Witnesses
Inventor
George Homfray
THE GRAPHIC CO. PHOTO-LITH. 39 & 41 PARK PLACE, N.Y.

United States Patent Office.

GEORGE HOMFRAY, OF PARISH OF HALESOWEN, ENGLAND.

Letters Patent No. 62,335, dated February 26, 1867.

---

IMPROVEMENT IN MACHINES FOR PREPARING RODS FOR CHAIN LINKS.

---

The Schedule referred to in these Letters Patent and making part of the same.

---

TO ALL WHOM IT MAY CONCERN:

Be it known that I, GEORGE HOMFRAY, of Whitley Lodge, in the parish of Halesowen, in the county of Worcester, England, have invented a new and improved Mode of Preparing Iron or Steel Rods or Bars to Form Chain Links; and I do hereby declare that the following is a full and exact description thereof, which will enable others skilled in the art to make and use the same, reference being had to the accompanying drawings, forming part of this specification, in which—

Figure 1 is a front elevation.
Figure 2 is a top view.
Figure 3 is an end elevation; and
Figure 4 is a section on the line $x\,y$.

The letters of reference indicate in all the views similar parts.

My machine, as I prefer to construct it, is made with a bed, A, having two slides, as shown more distinctly on fig. 4 by $a\,a$, and two feed-screws, S S. Attached to one end of this bed is the head-stock B, which carries the main spindle C, with the loose gear-wheel $c'$, and underneath it the driving-shaft D, fig. 1, with pinion $d$ and mitre-wheel $e$ and driving cone-pulleys $d'\,d''$. An idler mitre-wheel, $f$, is placed under the head-stock, and imparts motion to the loose mitre-wheel $g$. Also, underneath the head-stock, and in line with the driving-wheel shaft D, is placed the feed-screw S, upon the end of which the loose mitre-wheel $g$ can revolve. The clutch E, sliding on feathers in the end of the screw S, can be shifted by the clutch-lever $h$ from the clutch-teeth upon the wheels $e$ and $g$, and a right or left-hand motion can be thus imparted to the screw S. On the back side of the head-stock is placed the gear-wheel $i$, which communicates motion to the system of change-wheels $i'\,i''$, driving the screw S, so as to give any required number of revolutions as compared with the revolutions of the spindle. The clutch F, (operated by the handle $j$,) sliding on feathers on the main spindle C, stops and starts the spindle and the screw S. Upon the face of the spindle C is placed the chuck G, which carries one end of the mandrel H, which mandrel is formed with such section as will give the shape desired for the interior of the unwelded link. The mandrel passes through the stripping-collar G and I, the steady-rest collar $I'$, and a bearing at the other end, $I''$. The stripping-collar I runs in the carriage J, which is traversed up and down the bed A on the slide $a$, by the screw S and nut $s'$, (see fig. 4,) the rod $h$, with the pins $h\,h$, which will be struck by the head J as it approaches the end of its motion, preventing any overrunning of the screw. The dog $k$ is inserted in the face of the stripping-collar I. The steady-rest collar runs in the head K, which is carried upon and moves with the carriage M, and sustains the mandrel near the place upon which the bar or rod is being coiled, (the steady-rest collar is not needed for the large coils,) and the bearing $I''$ is in the moving-head L, which rests upon the slide $a$, but is not driven by the screw S. These last two supports swing away to allow the coil to be stripped off the mandrel. The carriage M traverses upon the bed A on the slide $a$, being driven down the bed, away from the head, by the screw S and the opening-nut N. This nut is opened and closed by the cams $n$ and handle $n'$, by means of which it can be engaged with or disengaged from the screw. The worm-wheel O, with its crank-handle $o$, enables the bed M to be returned up the bed A by hand. The sliding-carriage M carries the head P, into which is fixed the lever $p$, by means of which a grooved roller is made to bear upon the rod or bar to be coiled, so as to distribute it uniformly upon the mandrel.

The mode of operating this machine is as follows: The stripping-collar I is placed near the chuck G, and the head-pin is placed in such a position that the bar or rod passing through P will pass under the dog $k$, between it and the mandrel H. There is then taken a bar or rod, while yet at the proper heat, after having been rolled, (I prefer this to reheating, although reheating will answer,) the end of which is inserted under the dog $k$, and upon starting the spindle (by the lever $j$) the carriage M travels down the bed A simultaneously with the rotation of the mandrel H, until the entire length of rod is coiled upon the mandrel H. Permitting the machine to remain in motion until the steady-rest collar $I'$ passes the end of the mandrel H, removing the bearing $I''$ as it passes, and then stopping and moving $I'$ and $I''$ aside, the screw S is then placed in motion, (by the lever $h$,) and the stripping-collar I moved down the mandrel, shoving the coil before it. For some purposes the rods or bars may be coiled cold. After I have thus made a coil, I proceed to cut, shear, or saw up the same in such a way as to form the proper scarf or lap for welding when one or more convolutions of such coil are compressed together.

What I claim as my invention, and desire to secure by Letters Patent, is—

The rotating mandrel H, in combination with the carriages M and J, or any construction, substantially the same, arranged and operated substantially as described for the purpose of laying and stripping the coil of rod or bar.

GEORGE HOMFRAY.

Witnesses:
S. N. WILDING, *United States Vice Consul, Liverpool.*
JOHN WILLIAMS, *Merchant, Liverpool.*